United States Patent
Landis

[19]

[11] Patent Number: 6,158,885

[45] Date of Patent: Dec. 12, 2000

[54] THERMOCOUPLE-TO-EXTENSION WIRE AMBIENT TEMPERATURE ERROR CORRECTION DEVICE

[75] Inventor: Donald G. Landis, Hollis, N.H.

[73] Assignee: Integrated Control Concepts, Inc., Hollis, N.H.

[21] Appl. No.: 09/099,690

[22] Filed: Jun. 18, 1998

[51] Int. Cl.$^7$ .................................................. G01K 7/02
[52] U.S. Cl. .................... 374/179; 374/181; 374/182; 374/164
[58] Field of Search .................. 374/1, 179, 164, 374/181, 182

[56] References Cited

U.S. PATENT DOCUMENTS

| | | | |
|---|---|---|---|
| 3,648,523 | 3/1972 | Kemper et al. | 374/182 |
| 3,690,177 | 9/1972 | Fluegel | 374/182 |
| 3,996,071 | 12/1976 | Klicks et al. | 374/182 |
| 4,358,957 | 11/1982 | Lougheed et al. | 374/182 |
| 4,450,315 | 5/1984 | Waterman | 374/182 |
| 4,804,272 | 2/1989 | Schmitz . | |
| 5,088,835 | 2/1992 | Shigezawa . | |
| 5,090,918 | 2/1992 | Zoellick et al. | 374/182 |
| 5,246,293 | 9/1993 | Luotsinen . | |
| 5,328,264 | 7/1994 | Krencker . | |
| 5,340,216 | 8/1994 | Goldschmidt . | |
| 5,484,206 | 1/1996 | Houldsworth . | |
| 5,658,479 | 8/1997 | Tadokoro | 219/505 |

FOREIGN PATENT DOCUMENTS 0634120  10/1978  U.S.S.R. .

*Primary Examiner*—Diego Gutierrez
*Assistant Examiner*—Jeanne-Marguerite Goodwin
*Attorney, Agent, or Firm*—Lambert & Assoc., PLLC; Gary E. Lambert; Donald J. MacDonald

[57] ABSTRACT

The invention relates to a device for correcting error in temperature readings caused by thermocouple-to-extension wire ambient temperature fluctuations. The device creates an isothermal mass which raises the temperature of terminals to higher than ambient temperature. The isothermal mass consists of a self heating thermistor surrounded by thermal conductive epoxy inside an isothermal mass which contains the terminals. The isothermal mass is enclosed within insulating discs using a closure casing to complete the assembly. Using these higher than ambient temperature terminals for the connection between a thermocouple and extension wires, any error due to ambient temperature fluctuations is minimized.

15 Claims, 2 Drawing Sheets

THERMOCOUPLE-TO-EXTENSION WIRE AMBIENT TEMPERATURE ERROR CORRECTION DEVICE

BACKGROUND

The present invention relates to a device for extending thermocouple wires. More specifically, this device is used to minimize any error caused by ambient temperature fluctuations of a pair of connections points between a thermocouple and its corresponding extension wire pair.

Thermocouples have been recognized as temperature measurement devices since the early 1800's. They consist of two dissimilar metals joined at a temperature sensing junction. At this junction, a rise in temperature creates an EMF (electromotive force) within the circuit. When voltage is measured across an open circuit, it is a function of the junction temperature and the composition of the two dissimilar metals. If thermocouple wires need to be extended by use of an extension wire, an additional junction is added to the circuit and must be compensated for during voltage measurement. Many compensation techniques address the thermocouple to measurement circuit temperature variations, but they ignore the junction effect of the thermocouple to extension wire junction error. Much published literature leads us to believe that if the appropriate composition extension wire is used, then applications which use extension wire between actual thermocouple wire and cold junction compensation circuits will allow the measurement circuit to accurately measure hot junction temperatures. Test data indicates that applications where the thermocouple to extension wire connection point pairs fluctuate in temperature (25° C. to 125° C.), then significant temperature errors will be experienced by the measurement circuit. These errors arise from the additional thermocouple junction created by the thermocouple wire to extension wire connection.

The use of extension wire for extended length connections of noble metal thermocouples was introduced for two reasons—cost and maintainability. Since the cost of noble metal is high, the user in many applications will try to minimize the length and wire size of the noble metal thermocouple material. Although very small diameter wire (0.005 dia.) is adequate for many applications, the installation, handling, and maintenance of these wires is often impractical. A common solution is to use a large diameter thermocouple (0.020 dia.) with short leads (6 to 10 inches) to get the generated electromotive force to a more isothermal area, then to use a specifically formulated alloy wire to connect that junction to the measurement instrumentation.

One specific application where this technique is used is in the hot wall processes of semiconductor manufacturing. These process chambers operate in the 300° C. to 1250° C. range. It is common practice to use 6" to 8" type R or S (platinum-rhodium) thermocouples of #24 AWG wire. This allows for a rugged hot junction to be inside a heater wall while the wire ends are outside the heater wall in a more isothermal region. Because of the thermal losses of the heaters used in the manufacturing process, this more isothermal region will still often experience thermal fluctuations of as much as 70° C. resulting in ambient temperature as high as 95° C. The significance of this error is application specific and must be evaluated in terms of the total temperature error budget of the specific manufacturing process. If this additional error is significant relative to the thermal stability of the process, then an alternative solution should be considered.

SUMMARY

The present invention is directed to an ambient temperature error correction device for use with a thermocouple needing an extension wire, and solves the above mentioned problems of added error in temperature reading when extending the wires of a thermocouple.

The present invention minimizes the error in temperature measurement when extension wires are added to a thermocouple circuit. More specifically, the present invention provides a system for raising the temperature of a pair of connection points between a thermocouple and its corresponding extension wire pair to a sufficiently high temperature such that the connection points are less likely to be affected by ambient temperature fluctuations. The system comprises an isothermal mass with physical screw connections for mating each thermocouple wire to the appropriate extension wire material at the same temperature as its mated pair, and at warmer than ambient temperature. Although the best solution would be to maintain the isothermal mass at a constant temperature, the minimization of temperature fluctuations will still significantly enhance the stability of the thermocouple to the extension wire functionality. If this minimization of temperature fluctuations can be achieved without the implementation of an additional control circuit, then the simplified solution has merit in many applications, especially those where this junction has a high ambient temperature and normal electrical cold junction compensation techniques are prohibited.

It is therefore an object of the present invention to provide a device which will connect a plurality of thermocouple conductors to a corresponding plurality of extension wire pairs while maintaining a minimized temperature gradient at the junction point. The device encompasses a positive temperature coefficient thermistor which is connected to terminals such that voltage can be supplied to the thermistor. A quasi-stable heater can be created without the addition of control circuitry by utilizing the self heating characteristics of the positive temperature coefficient thermistor. The thermistor is centrally located and permanently fixed within an isothermal mass using a thermal conductive epoxy. This isolation ring contains a plurality of pairs of electrical terminals for connection of the thermocouples and their corresponding extension wire pairs. Each terminal is isolated from all others and has a means of connecting a thermocouple conductor in series with its extension wire. When voltage is applied to the positive temperature coefficient thermistor terminals, the thermistor heats the isolation ring mass containing the electrical terminals. This in turn raises the temperature of the additional cold junction created when adding the extension wires to the thermocouple. As a result of raising the temperature of the connection terminal and making it warmer than ambient temperature, the intermediate junction thermal effects greatly diminish. Although the isothermal mass may not be able to be held at a constant temperature, the quasi stable heater can minimize temperature fluctuations significantly. This in turn enhances the stability of the thermocouple to the extension wire functionality. Data shows that for applications of certain thermocouples with extension wire requirements, as much as 3–4° C. measurement errors can be reduced to less than 0.5° C. by using this device.

By creating the quasi stable thermal mass described above, the inventor has developed a safe and efficient device that minimizes errors in temperature readings resulting from the addition of extension wires to thermocouple devices. As will be made clear from the drawings presented below, the preferred configuration of the invention utilizes a self heating positive temperature coefficient thermistor to heat the thermocouple to extension wire junction without additional circuitry.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE PREFERRED EMBODIMENTS

Figure 1:
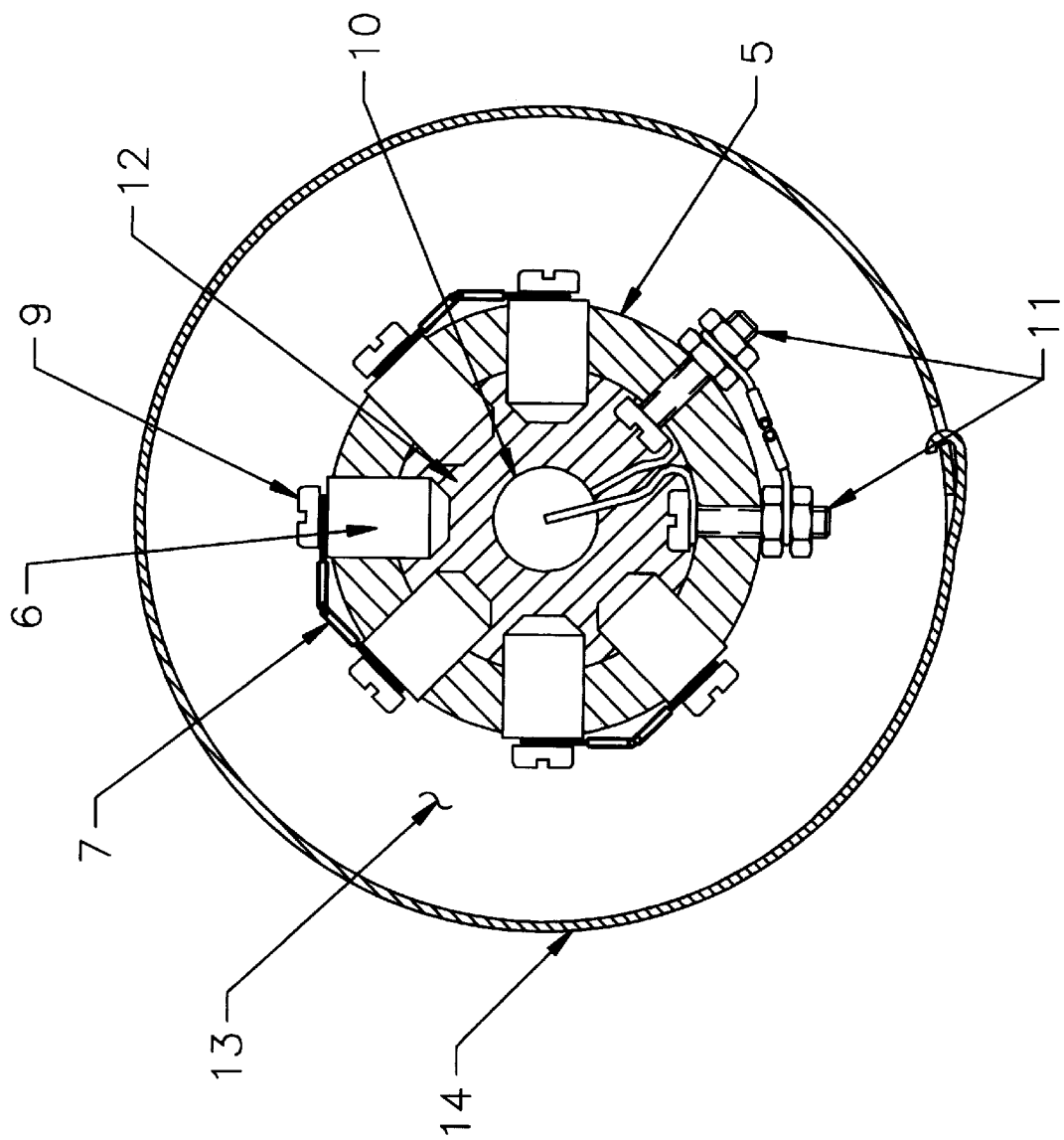
FIG. 1 depicts a cross section plan view of a preferred embodiment of the invention.
Figure 2:
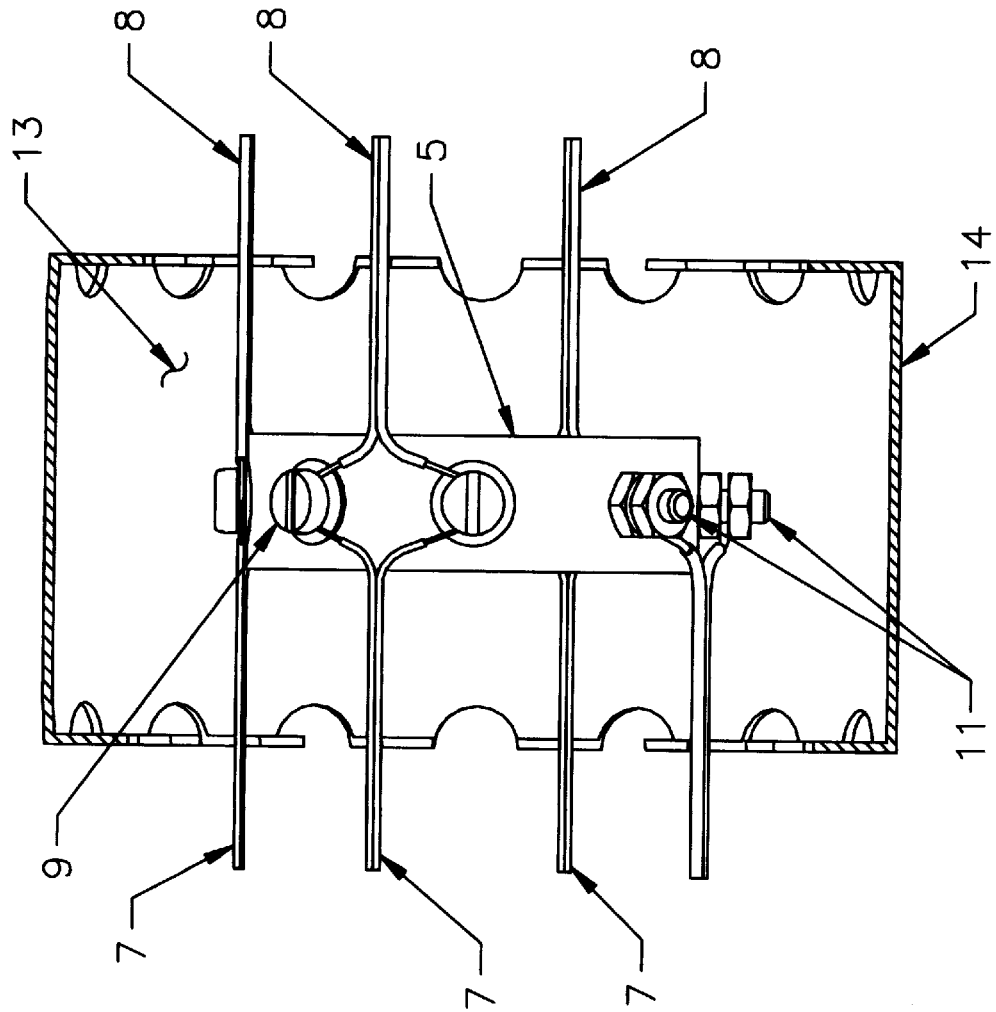
FIG. 2 depicts a partial cross section end view of FIG. 1.

With reference to FIGS. 1 and 2, a preferred embodiment of the present invention is depicted. In this embodiment, an isothermal mass 5 having a plurality of connection terminals 6 for connecting a plurality of thermocouples to extension wires is provided. The figures depict the isothermal mass 5 in the shape of a ring, however the shape itself is unimportant. A number of manufacturing advantages are believed to be gained by utilizing the ring configuration. An important advantage being that the connection terminals 6 can be equidistantly arranged around the isothermal mass 5 in a radial pattern. Each terminal would then be heated evenly and equally.

It being specifically understood that differing configurations are possible regarding the geometry of the isothermal mass 5, for ease of description reference to the ring configuration is resorted to for the remainder of the specification. In the preferred embodiment, isothermal mass 5 has an inner and an outer diameter sufficient to accommodate the plurality of isolated terminals 6 positioned radially and pointing outward from ring center. The width of the isothermal mass 5 should be slightly larger than the diameter of the terminals 6 such that the terminals are electrically insulated from external contact. The thickness of the isothermal mass 5 in proximity to each terminal should be slightly less than the length of the terminal. The dimensions should enable an external end of the terminal 6 to extend outwardly from the isothermal mass 5 sufficiently to accommodate a wire connection and an internal end of the terminal 6 should protrude internally into the central hole of the ring-shaped isothermal mass 5.

The terminals 6 must be made of a material that is thermally conductive but not necessarily electrically conductive. A preferred material for the terminals would be copper. The function of terminals 6 is to join a thermocouple wire 7 and an extension wire 8. To ensure that this configuration exists, each of the terminals 6 possesses a tapped hole on its external end of terminals 6 to accept fasteners 9 for conductor attachment means. To avoid the creation of an additional junction, the thermocouple wire 7 and extension wire 8 must be placed in intimate contact one with the other. To separate the wires and rely upon the electrical conductivity of the terminal to complete the circuit will result in an additional junction which should be avoided. Therefore the wires should actually be overlapped beneath the fasteners 9. In sum although there are various configurations of wire lead connections and terminal material, it is necessary to this invention that attachment of the conductors be such that the series of one thermocouple conductor to one extension wire is maintained and heat conductivity is promoted.

Centrally located within the isothermal mass 5 is a heat source, in the preferred embodiment, a thermistor 10. The thermistor 10 is a positive temperature coefficient type such that it exhibits self heating characteristics. Two terminals 11 are provided within the isothermal mass 5 for electrically powering the thermistor 10. The leads of thermistor 10 are attached to the internally facing set of terminals 11 and a voltage supplying electrode is attached to the external portion of said terminals. The volume surrounding thermistor 10, the internal portion of terminals 6, the internal portion of terminals 11, and the inner volume of the isothermal mass 5 is filled with a thermally conductive and electrically insulating epoxy 12. FIG. 2 shows the entire structure contained within an insulation material 13 such as fiberglass which is further held together with a casing 14 which serves to contain and enclose the entire device. The casing 14 can be made of any rigid material such as stainless steel and can be configured with flanges or clips to allow the device to be mounted in any convenient location. It should be apparent that the casing 14 and insulation material 13 do not form the essence of the invention and are entirely unnecessary to its operation. The insulation serves to stabilize the heat flux within the isothermal mass 5 and the casing 14 provides a means for mounting the device to a surface or subassembly as well as provide protection against inadvertent damage.

A thermal equation for the assembly of FIGS. 1 and 2 can be approximated using the following equation:

Defining the components as follows:

$T_{PTC}$=Temperature at positive temperature coefficient thermistor $R_M$=Positive temperature coefficient material resistance $R_E$=Thermal conductive epoxy resistance $R_C$=Copper stud resistance (thermal)

$T_J$=Temperature at thermocouple to extension wire junction $R_I$=Extension wire resistance (thermal)

$T_{AMB}$=Ambient temperature $q_1$=Heat flow from thermistor to thermocouple-to-extension wire junction $q_2$=Heat flow from ambient to thermocouple-to-extension wire junction With $\Delta T_A = T_{PTC} - T_J$, and $\Delta T_B = T_J - T_{AMB}$ Then $$\text{Total heat flow to junction} = q_1 + q_2 = \frac{\Delta T_A}{R_M + R_E + R_C} + \frac{\Delta T_B}{R_I}$$

Test data for a type R/S thermocouple connected to an alloy 11/copper extension wire pair produces a 5% error for a 70° C. shift in the region of 25° C. to 95° C. ambient temperature. By choosing a 100° C. positive temperature coefficient thermistor, the junction $T_J$ is held at a temperature above the ambient shift. By implementing these choices into the device, the equivalent schematic is as shown in the following equation. Selecting $R_1$ to be 10 times $R_M + R_E + R_C$ then, $$\text{Total heat flow to junction} = q_1 + q_2$$

$$= \frac{\Delta T_A}{R_M + R_E + R_C} + \frac{\Delta T_B}{(10)R_M + R_E + R_C}$$

$$\text{or} \quad = \frac{\Delta T_A}{R_M + R_E + R_C} + \frac{(0.1)\Delta T_B}{R_M + R_E + R_C}$$

The actual junction temperature change due to a 70° C. shift will be ±7.0° C. The corresponding 5% error created by the added junction results in a maximum of 0.35° C. error in the thermocouple temperature reading.

As can be seen by the above example, a possible 3–4° C. error in temperature reading caused by ambient temperature fluctuations was reduced to 0.35° C. or less by incorporating the specifics of this invention. Whereas the error in temperature reading may not be eliminated completely, it is the object of this invention to minimize that error without the addition of control circuitry.

Although the above defined invention may have an infinite number of design configurations, it possesses certain recurring characteristics. The characteristics that define the invention are; the junctions are created at a quasi-stable temperature connection point heated by some type of heat source, the connections are insulated from each other and no additional control circuitry is necessary. Preferably, the heat source should comprise a positive temperature coefficient thermistor and the connections should be positioned around the thermal element such that they are equally heated. Accordingly, this invention is not limited to the particular embodiments disclosed, but is intended to cover all modifications that are within the spirit and scope of the invention as defined by the appended claims.

What is claimed is:

1. A thermocouple-to-extension wire ambient temperature error correction device comprising:

an isothermal mass, wherein said isothermal mass comprises a material that prevents electrical conductivity;

a plurality of terminals, wherein said terminals are of a length longer than the thickness of said isothermal mass, are positioned radially parallel around the periphery of said isothermal mass, one end of said terminals extending outward on exterior portion of said isothermal mass, an opposite end of said terminals extending into an internal cavity of said isothermal mass, and having a means for connection of two conductors each;

a thermistor, wherein said thermistor is centrally positioned within said isothermal mass, comprising self heating characteristics for generation of heat flow to said terminals;

a thermal conducting means, wherein said thermal conducting means encompasses said thermistor within central cavity of said isothermal mass;

an insulation means, wherein said insulation means surrounds said isothermal mass, for constraint of heat flow from said terminals to an ambient area;

a casing wherein said casing houses said isothermal mass, said plurality of terminals, said thermistor, said thermal conducting means and said insulation means.

2. A device according to claim 1, wherein said terminals comprise an electrically conductive fastening device.

3. A device according to claim 2, wherein said fastening device comprises a tapped hole to accept a threaded fastener, positioned on the external end of said terminals; wherein said hole is concentric with said terminal.

4. A device according to claim 1, wherein said conductors comprise a thermocouple lead and an extension lead.

5. A device according to claim 1, wherein two of said terminals comprise an internal electrical connection for said thermistor leads and an external electrical connection for applied voltage.

6. A device according to claim 1, further comprising said casing means for mounting said device to a preferred location.

7. A thermocouple-to-extension wire ambient temperature error correction device comprising:

an electrically non-conductive material having a cavity therein;

a plurality of terminals, partially contained within said material and positioned radially parallel around the periphery of said material, wherein a first end of each terminal extends outward from said material and a second end of said terminal extends into said cavity, and each of said terminals further have a means for connection of conductors thereto;

a thermally conductive material, said thermally conductive material contained within said cavity of said electrically non-conductive material; and a thermistor, positioned within said thermally conductive material capable of connection to an electrical power source; wherein said thermistor when electrically activated generates heat flow which travels through said thermally conductive material into said terminals thereby increasing the base temperature of said terminals.

8. A device according to claim 7, wherein said terminals comprise a means for electrically connecting a thermocouple wire to an extension wire.

9. A device according to claim 7, wherein said terminals comprise a thermally conductive material.

10. A device according to claim 7 further comprising insulation for thermally isolating said electrically non-conductive material and said terminals from an ambient environment.

11. A device according to claim 10 further comprising a casing for mounting said device to a preferred location.

12. An apparatus for minimizing thermocouple junction errors comprising:

a heat source for generating a known quasi-stable quantity of heat;

at least one pair of terminals electrically isolated one from the other situated proximally to said heat source such that both terminals are equally heated by said heat source to a temperature in excess of ambient temperature of said terminals;

wherein said heat source comprises an electrical device capable of generating heat;

wherein said electrical device is a thermistor;

a quantity of electrically non-conductive, isothermal material in intimate communication with said heat source and said terminals to form an isothermal mass, within which said terminals are partially embedded positioned radially parallel around the periphery of said isothermal mass;

insulation surrounding said isothermal mass for constraining heat flow from said terminals to an ambient area;

a casing for containing said apparatus for minimizing thermocouple junction errors therein, wherein said casing enables said apparatus for minimizing thermocouple junction errors to be mounted in a convenient location.

13. The apparatus of claim 12 wherein said terminals are spaced equidistantly from said heat source within said isothermal material.

14. The apparatus of claim 13 wherein each of said terminals connects one lead of a thermocouple to one lead of an extension wire in intimate communication, one with the other.

15. The apparatus of claim 14 wherein said isothermal mass concentrically surrounds said heat source which forms a central axis of the device, and wherein said terminals are radially displaced around said isothermal mass such that one end of each terminal protrudes from said isothermal mass, said end adapted to receive and retain said leads.

* * * * *